US010683055B2

(12) United States Patent
Klieber

(10) Patent No.: US 10,683,055 B2
(45) Date of Patent: Jun. 16, 2020

(54) BICYCLE HANDLEBAR COMPRISING ADDITIONAL HANDLEBAR GRIPS

(71) Applicant: Jochen Klieber, Tacherting (DE)

(72) Inventor: Jochen Klieber, Tacherting (DE)

( * ) Notice: Subject to any disclaimer, the term of this patent is extended or adjusted under 35 U.S.C. 154(b) by 0 days.

(21) Appl. No.: 15/679,596

(22) Filed: Aug. 17, 2017

(65) Prior Publication Data
US 2018/0057098 A1    Mar. 1, 2018

(30) Foreign Application Priority Data

Aug. 25, 2016  (EP) ...................................... 16001866

(51) Int. Cl.
*B62K 21/12*      (2006.01)
*B62K 21/26*      (2006.01)

(52) U.S. Cl.
CPC ............ *B62K 21/125* (2013.01); *B62K 21/26* (2013.01)

(58) Field of Classification Search
CPC ...... B62K 21/12; B62K 21/125; B62K 21/26; B62D 1/043
USPC ................................. 74/551.1, 551.8, 551.9
See application file for complete search history.

(56) References Cited

U.S. PATENT DOCUMENTS

| | | | | |
|---|---|---|---|---|
| 5,235,871 A | * | 8/1993 | Yamazaki ............ | B62K 21/125 74/551.8 |
| 5,425,285 A | * | 6/1995 | Cheng .................. | B62K 21/125 403/103 |
| 9,266,575 B1 | * | 2/2016 | Hed .......................... | B62J 9/001 |
| 2009/0223320 A1 | * | 9/2009 | Chen ...................... | B62K 21/26 74/551.9 |
| 2011/0215549 A1 | * | 9/2011 | Plainfield ................ | B23P 11/00 280/270 |
| 2012/0137821 A1 | * | 6/2012 | Badollet ................ | B62K 21/26 74/551.9 |

(Continued)

FOREIGN PATENT DOCUMENTS

| | | |
|---|---|---|
| EP | 0478901 | 4/1992 |
| TW | M451307 | 4/2013 |

OTHER PUBLICATIONS

Office Action regarding related Taiwan application 106127243, dated Apr. 25, 2018 (6 pgs.).

(Continued)

*Primary Examiner* — Prasad V Gokhale
(74) *Attorney, Agent, or Firm* — Lerner, David, Littenberg, Krumholz & Mentlik, LLP

(57) ABSTRACT

A bicycle handlebar comprising an additional handlebar grip having an additional wrist rest is provided. The additional handlebar grip is arranged between the conventional handlebar grip and the fitting and comprises an upper flattened and a lower flattened surface. The additional handlebar grip can also contain a grip piece that comprises a further flattened support surface. In particular, the upper flattened surface can be designed as a depression between the clamp and the grip piece. A two-component design of the additional handlebar grip, having a main component that comprises a mandrel, and an attachment to be fitted onto the mandrel, is also possible. In this case, the second component can be made of plastics material. In another embodiment, the second component comprises a grip piece having two support surfaces that are arranged laterally on the grip piece.

18 Claims, 7 Drawing Sheets

(56) References Cited

U.S. PATENT DOCUMENTS

2015/0197306 A1\* 7/2015 Denby ................. B62K 21/125
                                                74/551.9
2016/0176468 A1\* 6/2016 Poole ..................... B62K 21/12
                                                280/263

OTHER PUBLICATIONS

Translation summary of Office Action regarding related Taiwan application 106127243, dated May 17, 2018 (4 pgs.).

\* cited by examiner

BICYCLE HANDLEBAR COMPRISING ADDITIONAL HANDLEBAR GRIPS

FIELD OF THE INVENTION

The present invention relates to bicycle handlebars for improved provision of wrist rests and additional gripping positions for the user. In particular, the present invention relates to bicycle handlebars comprising an additional handlebar grip for providing a wrist rest, and to a bicycle comprising a bicycle handlebar.

TECHNOLOGICAL BACKGROUND

In order to increase riding comfort, to provide additional gripping positions, and to increase the riding performance of the rider of the bicycle, additional handlebar grips are nowadays mounted on the right-hand and left-hand ends of the bicycle handlebar. Said additional handlebar grips are usually referred to as "bar ends". The additional handlebar grips known from the prior art are therefore positioned and fastened after the two handlebar grips that are fixed to each of the outer ends of the handlebar. In this case, it is conventional to mount the known additional handlebar grips by means of clamps or by internal clamping in the tubular handlebar.

SUMMARY OF THE INVENTION

The object of the invention can be considered that of providing a bicycle handlebar having an improved additional handlebar grip, and thus in particular allowing new gripping possibilities and wrist rests that are more ergonomic for the user.

The invention provides bicycle handlebars comprising an additional handlebar grip, and a bicycle according to the features of the independent claims. Developments of the invention are found in the dependent claims and in the following description.

The embodiments described relate both to the bicycle handlebar and to the bicycle.

According to one embodiment of the invention, a bicycle handlebar is provided, comprising an additional handlebar grip for providing a wrist rest. The bicycle handlebar comprises at least one handlebar grip and at least one fitting and at least one additional handlebar grip comprising a clamp. In a preferred embodiment, the bicycle handlebar comprises two handlebar grips, two fittings and two additional handlebar grips, each having a clamp. Furthermore, the additional handlebar grip of the present invention is fastened to the handlebar between the handlebar grip and the fitting, by means of the clamp. The additional handlebar grip comprises a first portion that extends forwards, away from the handlebar, starting from the clamp. The first portion comprises an upper flattened surface and a lower flattened surface, the upper flattened surface being arranged so as to provide a wrist rest for the user of the bicycle. A position inside the fitting, i.e. offset towards the stem of the bicycle when viewed from the fitting in question, is a possible alternative option for mounting the additional handlebar grip.

The new arrangement of the additional handlebar grip according to the invention, between the handlebar grip and the fitting, in combination with the new geometric shape of the additional handlebar grip having the two flattened surfaces, allow entirely new gripping positions for the user in the region between the handlebar grip and the fitting, which region has not previously been used for this purpose.

In this case, the lower flattened surface can be designed as part of a rib for example, which is arranged on the lower face of the additional handlebar grip and therefore faces towards the ground on which the bicycle is located.

The upper flattened surface is designed and suitable for supporting the heel of the hand of the user of the bicycle handlebar. Resting the hands on the heels of the hands in this new position, i.e. between the conventional handlebar grip and the fitting, allows a narrower hand support, in the mounted position having an upper flattened surface projecting forwards in a planar manner and a grip piece projecting inwards, than is possible using the additional handlebar grips known from the prior art. This provides the possibility of new gripping and wrist-resting positions for the user in the region between the handlebar grip and the fitting, which region was previously not used for providing a systematic wrist rest by means of additional handlebar grips.

In this case, within the context of the present invention, the term "fitting" can be understood as a brake and/or gear lever for example.

In this and in all other embodiments, the technical explanations regarding a first handlebar grip, a first fitting and a first additional handlebar grip also apply in an identical manner to a second handlebar grip, a second fitting and a second additional handlebar grip on the bicycle handlebar. The bicycle handlebar according to the invention typically has a substantially symmetrical design that uses one right-hand and one left-hand additional handlebar grip according to the invention. For the sake of simplicity and clarity, however, the present invention will be described in the following with reference to a single additional handlebar grip on the bicycle handlebar according to the invention.

The first portion of the additional handlebar grip, in which the upper and lower flattened surfaces are situated, adjoins the clamp, proceeding from the handlebar. As can be seen from the embodiments in FIGS. 2 and 4 for example, the annular clamp can transition from the annular shape, and thus from the curvature thereof, into an inverted curvature which the upper flattened surface (see for example FIG. 2, reference numeral 206) can then adjoin. In another embodiment, a grip piece can then adjoin the upper flattened surface.

The preferably annular clamp allows for fastening to the bicycle handlebar. The first portion that adjoins said clamp and comprises the lower flattened surface makes it possible for the fitting, for example a brake and/or gear lever, to extend, when mounted, below the additional handlebar grip and towards the outside, i.e. towards the handlebar grip, proceeding from the fitting. The lower flattened surface thus provides sufficient clearance for the fitting. This can be seen clearly from the embodiment in FIG. 1 for example.

The combination of the upper flattened surface, which provides a wrist rest for the user, and the lower flattened surface, which provides clearance in which the fitting can penetrate, makes it possible to arrange the additional handlebar grip according to the invention in the narrow region between the handlebar grip and the fitting, and to simultaneously provide the user with the desired wrist rest in this region.

According to one embodiment, the additional handlebar grip protrudes beyond the front edge of the handlebar by approximately 100 mm to 170 mm, preferably by 130 mm.

According to another embodiment, the grip piece comprises a gripping portion at the outer end thereof, i.e. at the tip thereof, which gripping portion extends from the tip substantially in parallel with the main axis of the handlebar. This can be seen clearly in FIG. 7. In this case, the feature "substantially in parallel" covers a deviation of up to +/−20°, preferably +/−10°. In this embodiment, the additional handlebar grip then protrudes beyond the front edge of the handlebar by approximately 100 mm to 170 mm, preferably by 145 mm.

According to another embodiment of the invention, the upper flattened surface extends along an upper face of the additional handlebar grip and the lower flattened surface extends along a lower face of the additional handlebar grip.

In this case, within the context of the present invention, the term "upper face" of the additional handlebar grip is intended to denote the face that is towards the user when mounted on the handlebar. A plan view of said upper face of the additional handlebar grip and of the bicycle handlebar is shown in FIG. 1 for example. In contrast to the upper face, when mounted, the "lower face" of the additional handlebar grip faces towards the ground on which the bicycle is located. In other words, the upper face is directed towards the user and the lower face is directed away from the user. This can also be seen in particular from the side view in FIG. 5, and will be described in more detail within the context of the description of said drawing.

According to another embodiment of the invention, the first portion of the additional handlebar grip comprises a first lateral bearing surface on the fitting side between the upper and lower flattened surfaces. This first lateral bearing surface connects the upper and lower flattened surfaces. This first lateral bearing surface extends substantially perpendicularly to the upper flattened surface and/or substantially perpendicularly to the lower flattened surface. In addition, the first portion of the additional handlebar grip comprises a second lateral bearing surface on the handlebar grip side between the upper and lower flattened surfaces. The second lateral bearing surface extends obliquely between the upper and the lower flattened surface.

In this case, "oblique" is to be understood, in this embodiment, as angled towards the inside. From the outside, i.e. viewed or proceeding from the handlebar grip, the oblique surface approaches the stem towards the bottom. This can be seen clearly in FIG. 5.

In this case, within the context of the present invention, the term "fitting side" is intended to mean a side of the additional handlebar grip that faces the fitting. In addition, the term "handlebar grip side" is intended to mean a side of the additional handlebar grip that faces the handlebar grip.

In this case, "substantially perpendicular" is intended to include the possibility that the corresponding angle can be not only 90°, but also 90°±1°, ±2°, ±3°, ±4°, ±5°, ±6°, ±8°, ±9°, ±10°.

Advantageously, the chamfered lateral bearing surface provides additional clearance for the user's fingers, for example when actuating the brake lever that is guided towards the outside, below the additional handlebar grip. A brake lever of this kind that extends below the additional handlebar grip is shown in FIG. 1. This embodiment of the invention thus allows the handlebar grip, the additional handlebar grip and the fitting to be arranged in a compact manner and in addition, on account of the chamfered surface, provides sufficient clearance for actuating the brake lever and/or the gear lever but simultaneously also allows a comfortable wrist rest on the additional handlebar grip in this narrow space.

One embodiment of the first lateral bearing surface that extends perpendicularly to the upper and lower flattened surface is clearly shown in FIG. 2 by reference numeral 208. In contrast, the second lateral bearing surface that extends obliquely between the upper and lower flattened surface can be clearly seen in FIG. 3 (reference numeral 309) and FIG. 5 (reference numeral 509).

According to another embodiment, the first lateral bearing surface is designed as a bulged surface for accommodating fitting components. The bulged first lateral bearing surface can be designed as a negative form of the fitting for example.

According to another embodiment of the invention, the additional handlebar grip comprises a grip piece for the user to clasp. In this case, the upper flattened surface defines an outside edge of the additional handlebar grip on the grip side and an inside edge of the additional handlebar grip on the fitting side. Furthermore, the grip piece is arranged so as to be offset from the outside edge towards the inside edge.

Positioning the grip piece so as to be offset towards the inside both allows the user a gripping position in which said user clasps the grip piece, and allows a gripping position and/or a resting position on the upper flattened surface which is arranged further towards the outside, i.e. further towards the handlebar grip and further towards the outside edge compared with the grip piece. This can be seen clearly in the side view of FIG. 2, in which the upper flattened surface 206 extends away from the handlebar, and the grip piece 210 is and/or starts in a position that is offset further towards the inside. In other words, the upper flattened surface extends somewhat around the grip piece.

According to another embodiment of the invention, the grip piece extends from the first portion of the additional handlebar grip, away from the handlebar, in a direction that is oblique compared to a main extension direction of the first portion. Furthermore, the grip piece adjoins the upper flattened surface in a region that is arranged towards the fitting proceeding from the outside edge of the additional handlebar grip.

This geometric shape of this embodiment can be seen clearly in FIG. 1. The position and/or the region 114 of the additional handlebar grip, in which the grip piece 110 begins to extend, is not located on the outside edge 111 of the additional handlebar grip, but is instead offset from this outside edge towards the inside edge 112. This makes it possible for the upper flattened surface 106 to extend further away from the handlebar in the main extension direction 113, even though the grip piece already extends obliquely away from this main extension direction.

According to another embodiment of the invention, the grip piece comprises a flattened support surface on the fitting side.

The flattened support surface can extend tangentially away from the surface of the grip piece for example, and thus form a gentle transition so as to achieve a low specific load per unit area.

Advantageously, this embodiment can provide a support surface for the base of the user's thumb. This surface 115 and 215 is shown clearly in FIGS. 1 and 2, and is also referred to as the inner flank, while the upper flattened surface is referred to as the outer flank. The index finger and middle finger can then tightly clasp the surfaces 118 and 418.

Overall, this provides a wrist rest, on account of the upper flattened surface, a gripping position, on account of the grip piece, and a support surface for the base of the user's thumb, in the narrow region between the handlebar grip and the fitting.

According to another embodiment of the invention, the upper flattened surface is designed as a depression between the clamp and the grip piece.

This depression between the clamp and the grip piece can be seen, for example, in the embodiment in FIG. 2, in which said depression 206 is shown from the side.

According to another embodiment of the invention, the grip piece is designed so as to have a substantially circular cross section at the end thereof remote from the handlebar.

In this case, minor deviations from a circular shape can also be used for the grip piece.

According to another embodiment of the invention, the upper flattened surface extends, on the handlebar grip side, at least partially around the grip piece into an end region.

In principle, this end region can be understood as a region of the upper flattened surface. As can be seen in the embodiments in FIG. 1 and FIG. 2, this embodiment makes it possible for the wrist rest to be formed as a surface that is as long as possible and that extends away from the handlebar, even though the grip piece already extends, at the side, obliquely towards the inside from said main extension direction of the wrist rest, i.e. extends obliquely away towards the fitting.

According to another embodiment of the invention, the end region of the upper flattened surface extends into a rounded region of the additional handlebar grip, towards a lower face of the additional handlebar grip.

This embodiment makes it easy for the user's fingers to surround the upper flattened surface. Surrounding the rounded region or rounded surface (see reference numerals 118 and 518 in FIGS. 1 and 5 for example) in this manner provides a further ergonomically practical and comfortable gripping position for the user.

According to another embodiment of the invention, the additional handlebar grip is formed in two pieces, having one first and one second component. In this case, the first component is designed as a main component having a mandrel, and the second component is designed as an attachment to be fitted onto the mandrel of the main component.

This embodiment can provide certain advantages in terms of production. For example, the second component can be made of plastics material. In another embodiment, the second component comprises two support surfaces that are arranged laterally on the grip piece. In particular, in this case the support surfaces can be arranged on the grip piece, as denoted and shown by 106 and 115 in FIG. 1. In other words, the grip piece can comprise the wrist rest and the support for the base of the user's thumb. This additional handlebar grip according to the invention is assembled by simply fitting the attachment onto the main component.

According to one embodiment, a bicycle is provided comprising a bicycle handlebar according to any of the embodiments described above or the embodiment described in the following.

It should additionally be noted that "including" and "comprising/having" do not exclude any other elements or steps, and "one" or "a" do not exclude a plurality. Furthermore, it should be noted that features or steps that have been described with reference to one of the above embodiments can also be used in combination with other features or steps of other embodiments of the invention described above. Reference numerals in the claims are not to be considered limiting.

Embodiments of the invention will be described in the following with reference to the drawings.

BRIEF DESCRIPTION OF THE DRAWINGS

In the following description of the drawings, the same or similar reference numerals will be used for the same or similar elements.

The drawings are schematic and not to scale.

DETAILED DESCRIPTION OF EMBODIMENTS

Figure 1:
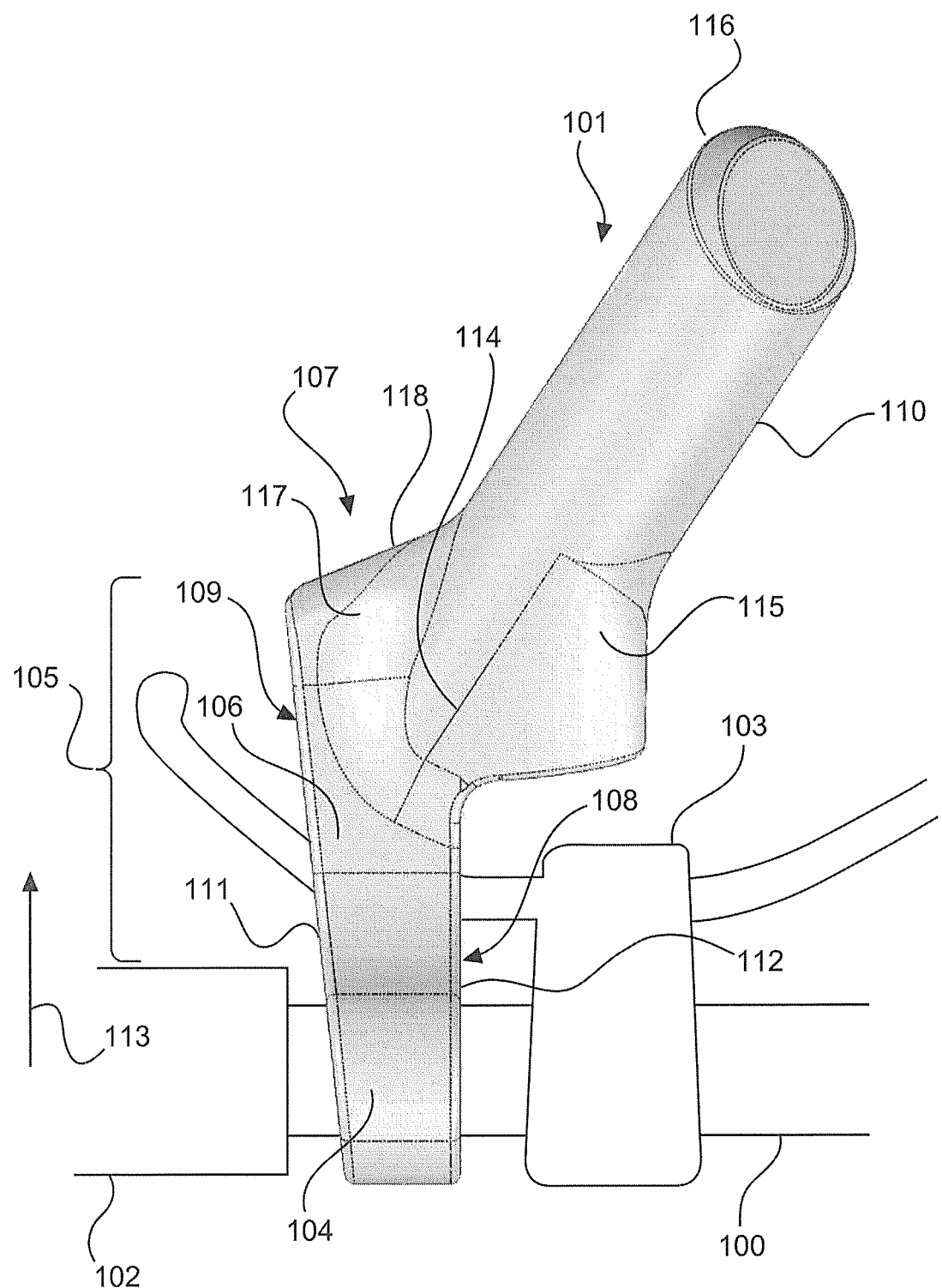
FIG. 1 is a schematic, three-dimensional view of a bicycle handlebar according to one embodiment of the invention.

FIG. 1 shows a bicycle handlebar 100 comprising an additional handlebar grip 101 that provides a wrist rest 106. The bicycle handlebar 100 comprises a conventional handlebar grip 102 and a fitting 103. Here, by way of example, said fitting 103 is designed as a brake lever which extends below, i.e. along a lower face of, the additional handlebar grip. The additional handlebar grip 101 comprises a clamp 104 for fastening to the handlebar 100. The additional handlebar grip comprises a first portion 105 that extends away from the handlebar 100, proceeding from the clamp 104. The first portion 105 comprises an upper flattened surface 106 and a lower flattened surface (see FIG. 5, reference numeral 519 for example). In this case, the upper flattened surface of the first portion is arranged so as to provide a wrist rest. The upper flattened surface 106 is therefore arranged on the upper face 107 of the additional handlebar grip 101. The lower flattened surface extends along the lower face of the additional handlebar grip (see FIG. 5). The additional handlebar grip comprises a grip piece 110 for the user to clasp. The upper flattened surface 106 defines an outside edge 111 on the grip side and an inside edge 112 on the fitting side. As can be seen clearly in FIG. 1, the grip piece is offset from the outside edge 111 towards the inside edge 112. In addition, FIG. 1 clearly shows that the grip piece extends from the first portion 106, away from the handlebar, in a direction that extends obliquely to the main extension direction 113 of the first portion. The grip piece 110 adjoins the upper flattened surface 106 in a region 114 that is arranged towards the fitting 103 proceeding from the outside edge 111 of the additional handlebar grip.

Figure 5:
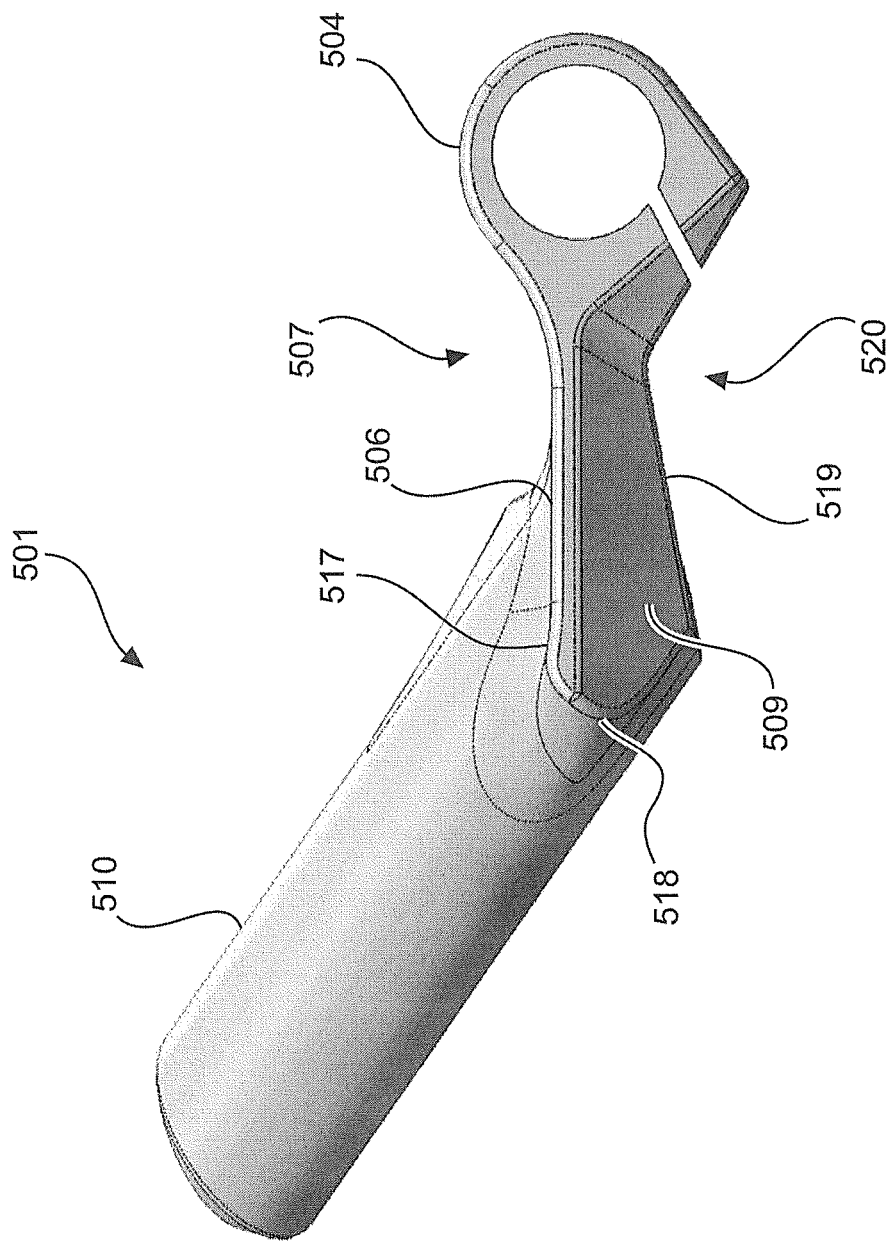
FIG. 5 is a side view of an additional handlebar grip according to one embodiment of the present invention.

The embodiment in FIG. 5 in addition clearly shows that the grip piece comprises a flattened support surface 115 on the fitting side. This surface provides a resting surface for the base of the user's thumb. The upper flattened surface 106 in addition extends, on the handlebar grip side, around the grip piece 110 at least in part. This occurs in the end region 117. It can further be seen in FIG. 1 that the end region 117 of the upper flattened surface 106 transitions and/or extends into a rounded region 118 of the additional handlebar grip, towards the lower face of the additional handlebar grip. Said transition can also be seen clearly in FIG. 5, in which the rounded region or rounded surface is denoted by 518.

Figure 2:
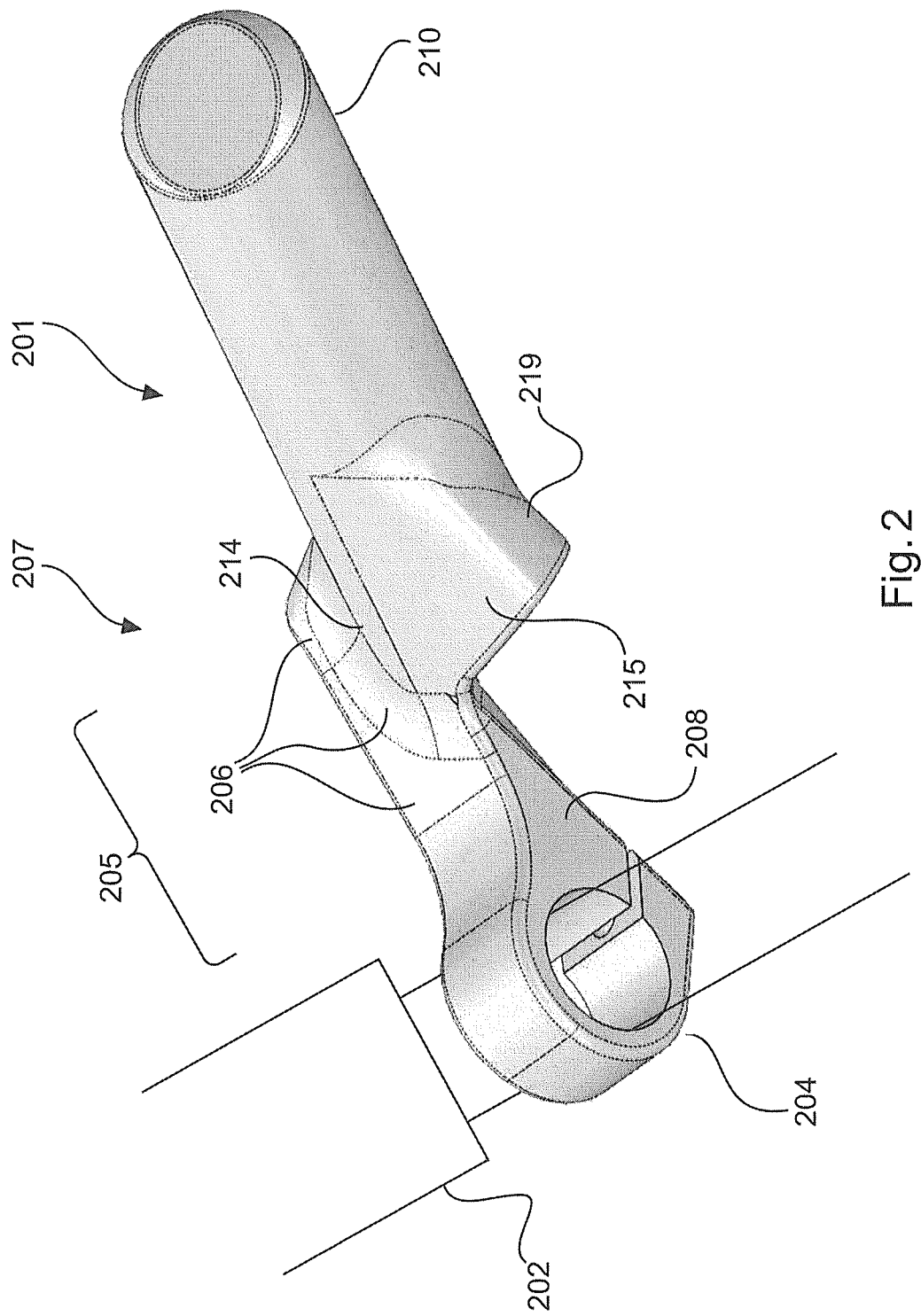
FIG. 2 is an oblique view of a bicycle handlebar according to one embodiment of the present invention.

The oblique view in FIG. 2 shows a further bicycle handlebar comprising an additional handlebar grip 201 according to the invention. The upper flattened surface 206 is shown in the first portion 205 of the additional handlebar grip 201, which surface is designed as a depression between the clamp 204 and the grip piece 210. FIG. 2 in addition clearly shows that the first lateral support surface 208 extends substantially perpendicularly to the upper flattened surface 206. A wrist rest for the user is thus provided on this upper face 207 of the additional handlebar grip 201, which wrist rest extends away from the clamp and protrudes beyond the grip piece 210 and/or extends around the grip piece 210. In this case, the resting surface 215 of the grip piece 210 transitions, in a rounded manner, into a lower region/a lower surface 219. This lower surface 219 is not semi-circular, but rather forms a planar surface for parallel finger support. The same applies to the surface 419 in FIG. 4.

Figure 3:
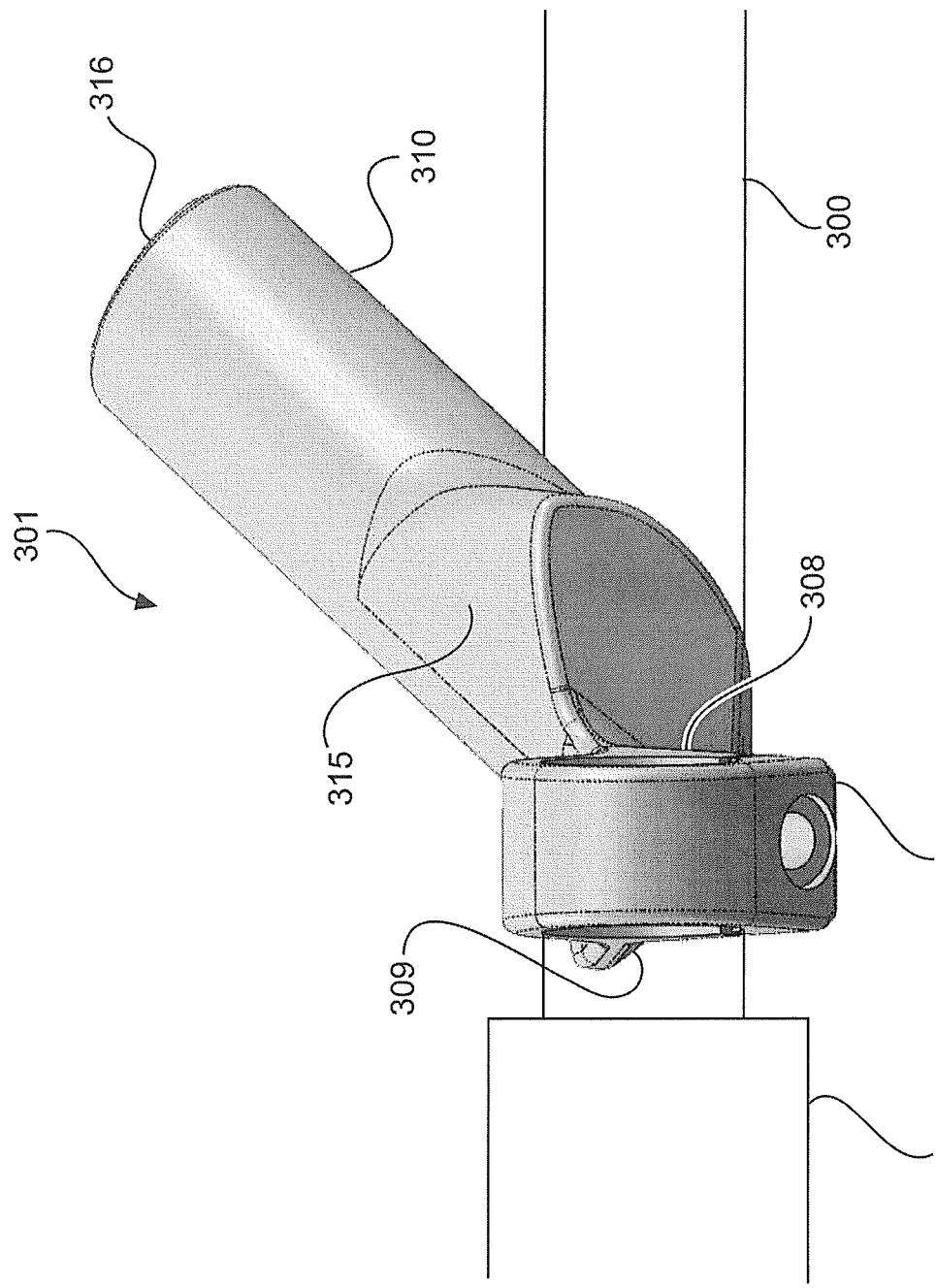
FIG. 3 is a schematic, three-dimensional view of a bicycle handlebar according to another embodiment of the invention.

FIG. 3 shows another embodiment of a bicycle handlebar 300 comprising an additional handlebar grip 301 according to the invention. The handlebar grip 302 is arranged to the left-hand side of the additional handlebar grip in FIG. 3. The grip piece 23 has a circular cross section at the end 316 remote from the handlebar and comprises a flattened support surface 315 on the fitting side. The lateral bearing surface 308, which extends perpendicularly, can likewise be clearly seen in FIG. 3. The second lateral bearing surface 309, which extends obliquely between the upper and lower flattened surfaces, can also be seen in FIG. 9.

Figure 4:
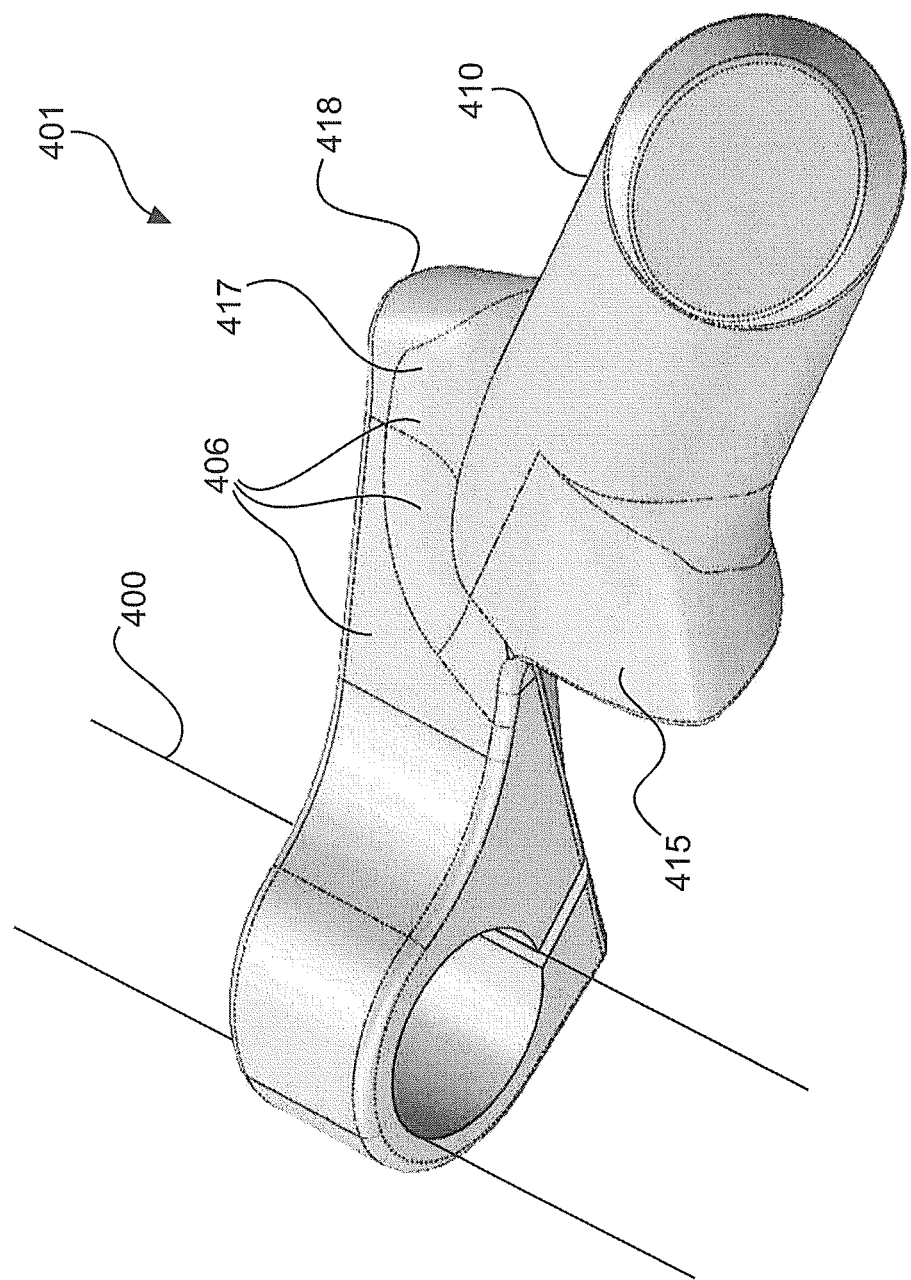
FIG. 4 is an oblique view of a bicycle handlebar according to one embodiment of the invention.

The oblique view in FIG. 4 likewise shows a bicycle handlebar 400 comprising an additional handlebar grip 401. The grip piece 410 comprises a flattened support surface 415 on the fitting side, which surface transitions in a continuous manner into a rounded region towards the lower face of the additional handlebar grip. The surface 415 extends tangentially away from the surface of the grip piece and thus forms a gentle transition so as to achieve a low specific load per unit area. The upper flattened surface 406 of the additional handlebar grip is designed as a depression between the clamp and the grip piece 410 and extends around the grip piece 410 in part. An end region 417 of the upper flattened surface 406 extends around the grip piece, the end region transitioning into a rounded region 418 that extends towards the lower face of the additional handlebar grip.

FIG. 5 is a side view of an additional handlebar grip 501 according to the invention. In this case, the clamp 504 can be clearly seen in the side view, and both the upper face 507 and the lower face 520 of the additional handlebar grip 501 can be clearly seen. The upper flattened surface 506 faces towards the user, while the lower flattened surface 519 faces towards the ground. The second lateral bearing surface 509, which extends obliquely between the upper flattened surface 507 and the lower flattened surface 519, can also be seen in FIG. 5. The end region 517 of the upper flattened surface 506, which is designed as a depression between the clamp 504 and the grip piece 510, transitions into the rounded region or rounded surface 518 which curves from the upper face 507 towards the lower face 520 of the additional handlebar grip.

Figure 6:
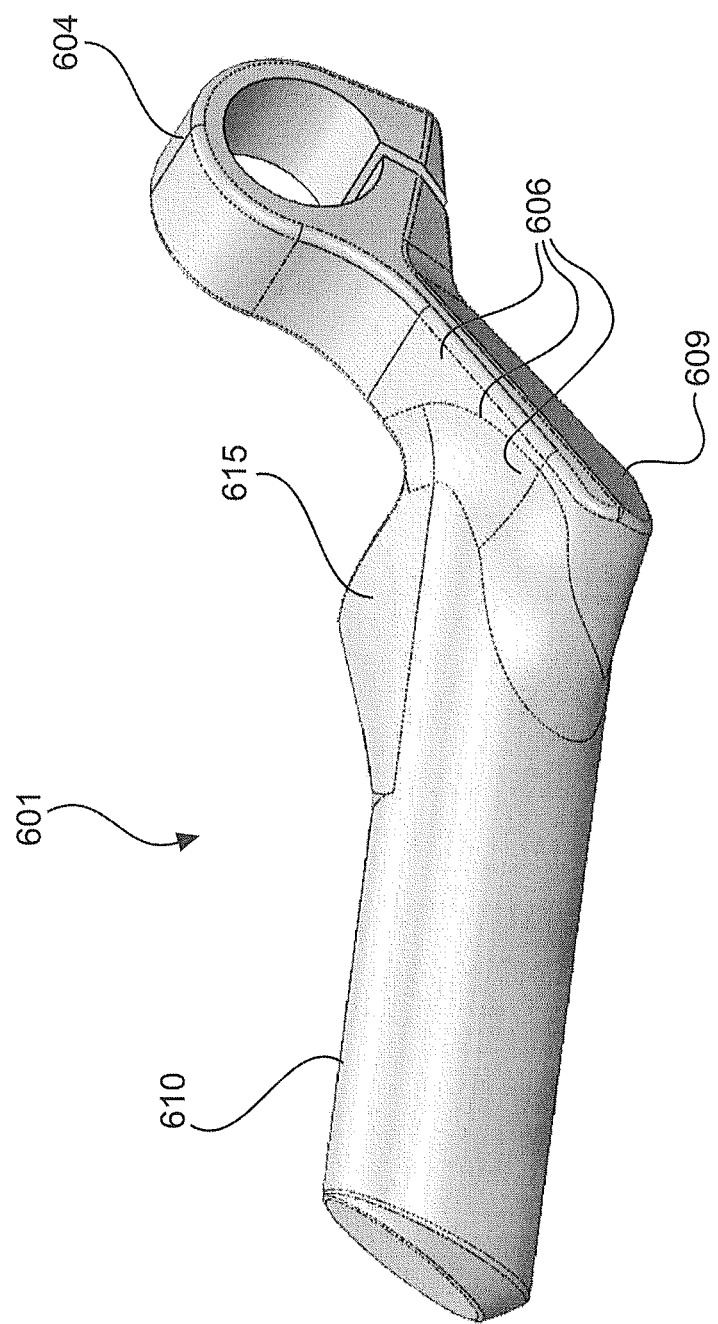
FIG. 6 is an oblique view of a bicycle handlebar according to one embodiment of the invention.
Figure 7:
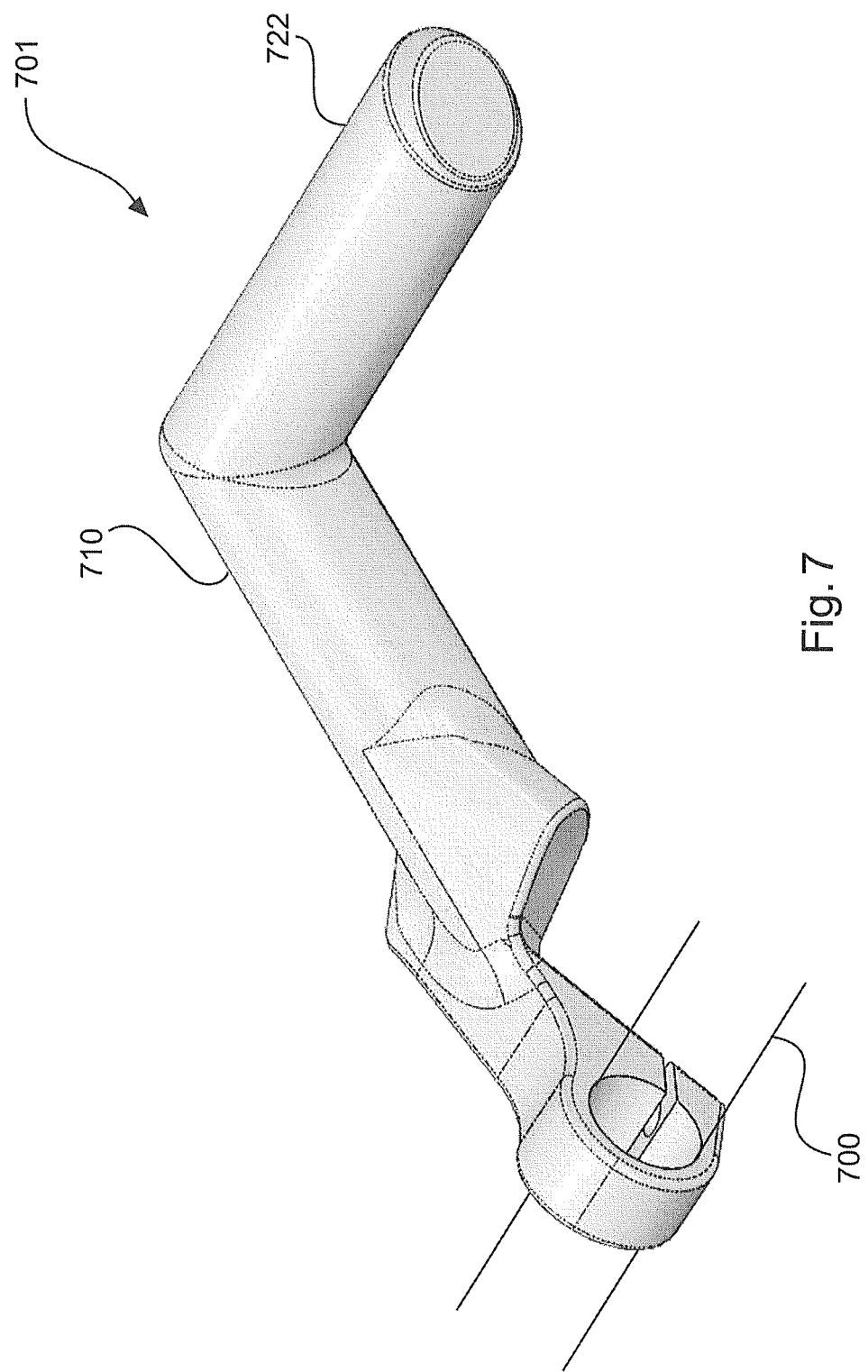
FIG. 7 is an oblique view of a bicycle handlebar according to one embodiment of the invention.

FIG. 6 is a further oblique view of an embodiment of the additional handlebar grip 601 according to the invention. Similarly to FIG. 5, the clamp 604, the support surface 615 of the grip piece 610, and the upper support surface 606 according to the invention on the upper face of the additional handlebar grip are shown here. The surface 609 that extends obliquely can also be seen in FIG. 6.

According to another embodiment of the additional handlebar grip 701, the grip piece 701 comprises a gripping portion 722 at the outer end thereof, i.e. at the tip thereof, which gripping portion extends from the tip substantially in parallel with the main handlebar axis of the handlebar 700. This additional gripping position can provide for improved ergonomics, in particular for marathon riders.

The invention claimed is:

1. An additional handlebar grip for attachment to a bicycle handlebar between a fitting and a handlebar grip of the handlebar, the additional handlebar grip comprising:
   a clamp for fastening the additional handlebar grip to the handlebar between the fitting and the handlebar grip of the handlebar, and
   a grip piece, the grip piece having a substantially circular cross section at the end thereof remote from the handlebar, and a first portion that extends away from the handlebar, and proceeds from the clamp,
   wherein the first portion comprises
   an upper flattened surface and
   a lower flattened surface, and
   wherein the upper flattened surface is arranged directly between the clamp and the grip piece so as to provide a wrist rest.

2. The additional handlebar grip according to claim 1, wherein the upper flattened surface extends along an upper face of the additional handlebar grip, and
   wherein the lower flattened surface extends along a lower face of the additional handlebar grip.

3. The additional handlebar grip according to claim 1, wherein the first portion of the additional handlebar grip comprises a first lateral bearing surface on the fitting side between the upper flattened surface and the lower flattened surface,
   wherein the first lateral bearing surface connects the upper and lower flattened surface,
   wherein the first lateral bearing surface extends substantially perpendicularly to at least one of the upper flattened surface and the lower flattened surface, and
   wherein the first portion of the additional handlebar grip comprises a second lateral bearing surface on the handlebar grip side between the upper flattened surface and the lower flattened surface, and
   wherein the second lateral bearing surface extends obliquely between the upper and the lower flattened surface.

4. The additional handlebar grip according to claim 1, wherein the upper flattened surface defines an outside edge of the additional handlebar grip on the handlebar grip side and an inside edge of the additional handlebar grip on the fitting side, and
   wherein the grip piece is offset from the outside edge towards the inside edge.

5. The additional handlebar grip according to claim 4, wherein the grip piece extends from the first portion, away from the handlebar, in a direction that is oblique compared to a main extension direction of the first portion, and
   wherein the grip piece adjoins the upper flattened surface in a region that is arranged towards the fitting proceeding from the outside edge of the additional handlebar grip.

6. The additional handlebar grip according to claim 4, wherein the grip piece comprises a flattened support surface on the fitting side.

7. The additional handlebar grip according to claim 4, wherein the upper flattened surface extends, on the handlebar grip side, at least partially around the grip piece into an end region.

8. The additional handlebar grip according to claim 7, wherein the end region of the upper flattened surface extends into a rounded region of the additional handlebar grip, towards a lower face of the additional handlebar grip.

9. The additional handlebar grip according to claim 1, wherein the upper flattened surface and the lower flattened surface extend in parallel at least in part.

10. A bicycle having a bicycle handlebar and additional handlebar grip according to claim 1.

11. A pair of additional handlebar grips for attachment in symmetrical arrangement to a bicycle handlebar, the pair of additional handlebar grips comprising:
 a first additional handlebar grip comprising:
  a clamp for fastening the first additional handlebar grip to the handlebar between a first fitting and a first handlebar grip of the handlebar, and
  a grip piece and a first portion that extends away from the handlebar, and proceeds from the clamp,
 wherein the first portion comprises:
  an upper flattened surface and
  a lower flattened surface, and
 wherein the upper flattened surface is arranged directly between the clamp and the grip piece so as to provide a wrist rest, and
 a second additional handlebar grip separate from the first additional handlebar grip and fastenable to the handlebar between a second fitting and a second handlebar grip of the handlebar in a substantially symmetrical design.

12. The pair of additional handlebar grips according to claim 11,
 wherein the upper flattened surface extends along an upper face of the first additional handlebar grip, and
 wherein the lower flattened surface extends along a lower face of the first additional handlebar grip.

13. The pair of additional handlebar grips according to claim 11,
 wherein the upper flattened surface defines an outside edge of the first additional handlebar grip on the first handlebar grip side and an inside edge of the additional handlebar grip on the first fitting side, and
 wherein the grip piece is offset from the outside edge towards the inside edge.

14. The pair of additional handlebar grips according to claim 13,
 wherein the grip piece extends from the first portion, away from the handlebar, in a direction that is oblique compared to a main extension direction of the first portion, and
 wherein the grip piece adjoins the upper flattened surface in a region that is arranged towards the first fitting proceeding from the outside edge of the first additional handlebar grip.

15. The pair of additional handlebar grips according to claim 13, wherein the grip piece comprises a flattened support surface on the first fitting side.

16. The pair of additional handlebar grips according to of claim 13, wherein the upper flattened surface extends, on the first handlebar grip side, at least partially around the grip piece into an end region.

17. The bicycle handlebar according to claim 16, wherein the end region of the upper flattened surface extends into a rounded region of the first additional handlebar grip, towards a lower face of the first additional handlebar grip.

18. An additional handlebar grip for attachment to a bicycle handlebar between a fitting and a handlebar grip of the handlebar, the additional handlebar grip comprising:
 a clamp for fastening the additional handlebar grip to the handlebar between the fitting and the handlebar grip of the handlebar, and
 a grip piece and a first portion that extends away from the handlebar, and proceeds from the clamp,
 wherein the first portion comprises
 an upper flattened surface and
 a lower flattened surface, and
 wherein the upper flattened surface is arranged directly between the clamp and the grip piece so as to provide a wrist rest; and
 wherein the upper flattened surface includes a depression between the clamp and the grip piece.

* * * * *